US009973979B2

United States Patent
Uchino et al.

(10) Patent No.: US 9,973,979 B2
(45) Date of Patent: May 15, 2018

(54) MOBILE COMMUNICATION METHOD AND RADIO BASE STATION

(71) Applicant: NTT DOCOMO, INC., Tokyo (JP)

(72) Inventors: Tooru Uchino, Tokyo (JP); Hideaki Takahashi, Tokyo (JP); Satoshi Nagata, Tokyo (JP); Wuri Andarmawanti Hapsari, Tokyo (JP); Kazuki Takeda, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 59 days.

(21) Appl. No.: 14/888,945

(22) PCT Filed: Apr. 11, 2014

(86) PCT No.: PCT/JP2014/060515
§ 371 (c)(1),
(2) Date: Nov. 4, 2015

(87) PCT Pub. No.: WO2014/181637
PCT Pub. Date: Nov. 13, 2014

(65) Prior Publication Data
US 2016/0119825 A1    Apr. 28, 2016

(30) Foreign Application Priority Data
May 9, 2013    (JP) ................. 2013-099356

(51) Int. Cl.
*H04W 4/00*    (2018.01)
*H04W 36/00*    (2009.01)
(Continued)

(52) U.S. Cl.
CPC ........ *H04W 36/0044* (2013.01); *H04B 7/024* (2013.01); *H04L 1/00* (2013.01);
(Continued)

(58) Field of Classification Search
CPC .. H04B 7/024; H04W 36/0055; H04W 16/28; H04W 36/08; H04W 36/0061;
(Continued)

(56) References Cited

U.S. PATENT DOCUMENTS

2012/0076038 A1*    3/2012    Shan ............... H04B 7/026
                                                    370/252
2012/0135771 A1    5/2012    Futaki
(Continued)

FOREIGN PATENT DOCUMENTS

JP    2013-501447 A    1/2013
WO    2011/016618 A1    2/2011
(Continued)

OTHER PUBLICATIONS

International Search Report issued in corresponding application No. PCT/JP2014/060515 dated May 13, 2014 (2 pages).
(Continued)

*Primary Examiner* — Mang Yeung
(74) *Attorney, Agent, or Firm* — Osha Liang LLP

(57) ABSTRACT

In a handover procedure between cells under different radio base stations (eNB), "RRC diversity" is implemented. A mobile communication method includes: a step A of transmitting, by a radio base station (eNB #1), "CoMP preparation" to a radio base station (eNB #10); a step B of transmitting, by the radio base station (eNB #10), setting information on a cell (#10) to the radio base station (eNB #1); a step C of conducting, by the radio base station (eNB #1), setting of the mobile station (UE) to perform CoMP transmission-reception; a step D of giving, by the mobile station (UE), the radio base station (eNB #1) notification that radio quality in the cell (#10) satisfies a predetermined condition; and a step E of instructing, by the radio base
(Continued)

station (eNB #1), the radio base station (eNB #10) to start scheduling for the mobile station (UE).

9 Claims, 6 Drawing Sheets

(51) Int. Cl.
*H04W 16/28* (2009.01)
*H04W 36/08* (2009.01)
*H04L 1/00* (2006.01)
*H04B 7/024* (2017.01)
*H04W 36/04* (2009.01)
*H04W 28/18* (2009.01)
*H04W 72/12* (2009.01)
*H04W 92/20* (2009.01)

(52) U.S. Cl.
CPC ....... *H04W 16/28* (2013.01); *H04W 36/0055* (2013.01); *H04W 36/0061* (2013.01); *H04W 36/0072* (2013.01); *H04W 36/08* (2013.01); *H04W 28/18* (2013.01); *H04W 36/04* (2013.01); *H04W 72/12* (2013.01); *H04W 92/20* (2013.01)

(58) Field of Classification Search
CPC ......... H04W 36/0072; H04W 36/0044; H04W 36/04; H04W 72/12; H04W 92/20; H04W 28/18; H04L 1/00
USPC ......................................................... 370/332
See application file for complete search history.

(56) References Cited

U.S. PATENT DOCUMENTS

| 2013/0165122 | A1* | 6/2013 | Tanaka | H04B 7/024 455/436 |
| 2013/0223272 | A1* | 8/2013 | Tao | H04B 7/024 370/252 |
| 2014/0126545 | A1 | 5/2014 | Tamura et al. | |
| 2014/0192734 | A1* | 7/2014 | Ng | H04L 5/0035 370/329 |

FOREIGN PATENT DOCUMENTS

| WO | 2011016560 A1 | 2/2011 |
| WO | 2012/020457 A1 | 2/2012 |
| WO | 2013/024574 A1 | 2/2013 |

OTHER PUBLICATIONS

Ericsson; "Heterogeneous networks mobility enhancements with handover signaling diversity"; 3GPP TSG-RAN WG2 #81, R2-130469, St. Julian's, Malta, Jan. 28-Feb. 1, 2013 (4 pages).
Ericsson; "Enhancing mobility robustness and offloading potential with RRC diversity"; 3GPP TSG-RAN WG2 #81bis, R2-131211, Chicago, USA, Apr. 15-19, 2013 (8 pages).
Office Action issued in the counterpart Japanese Patent Application No. 2013-099356, dated Jun. 6, 2017 (11 pages).
Office Action issued in corresponding Japanese Application No. 2013-099356, dated Jan. 9, 2018 (14 pages).

* cited by examiner

CASE OF INTER-eNB HANDOVER

MOBILE COMMUNICATION METHOD AND RADIO BASE STATION

TECHNICAL FIELD

The present invention relates to a mobile communication method and a radio base station.

BACKGROUND ART

In LTE (Long Term Evolution), when a mobile station UE in "RRC Connected state" moves across a cell boundary, a handover procedure is to take place in order to cause the mobile station UE to perform communication always by using an appropriate cell.

However, when the handover procedure takes place between cells using the same frequency, there is a concern that the mobile station UE cannot receive "HO command" from a handover source cell due to interference from a neighboring cell, and the handover procedure ends up in failure (see FIG. 5(a)).

Accordingly, as shown in FIG. 5(b), there has been proposed a control method (RRC diversity) configured to transmit the "HO command" not only from the handover source cell but also from a handover destination cell in order to improve a probability of reception of the "HO command" by the mobile station UE, and thus to suppress a failure in the handover procedure (see Non-patent Document 1).

Here, the "RRC diversity" can be implemented by CoMP transmission-reception (Coordinated Multi-Point transmission-reception) on a downlink.

Note that the CoMP transmission-reception on the downlink is a technique for improving throughput on the downlink by transmitting either the same or different data from multiple (a plurality of) TPs (Transmission Points) to the mobile station UE.

PRIOR ART DOCUMENT

Non-Patent Document

Non-patent document 1: 3GPP Written Contributions R2-131211

SUMMARY OF THE INVENTION

At present, the CoMP transmission-reception on the downlink can be carried out only in the cells under the same radio base station eNB.

Accordingly, there is a problem that the "RRC diversity" cannot be implemented in a handover procedure between cells under different radio base stations eNB as shown in FIG. 6.

The present invention has been made in view of the aforementioned problem. An object of the present invention is to provide a mobile communication method and a radio base station which are capable of implementing "RRC diversity" at the initiative of a mobile station UE in a handover procedure between cells under different radio base stations eNB.

A first feature of the present invention is summarized as a mobile communication method including: a step A of transmitting, by a first radio base station managing a first cell, a coordinated multi-point transmission-reception preparation signal to a second radio base station managing a second cell; a step B of transmitting, by the second radio base station, setting information on the second cell to the first radio base station; a step C of conducting, by the first radio base station, setting of a mobile station to perform coordinated multi-point transmission-reception using the first radio base station and the second radio base station; a step D of giving, by the mobile station, the first radio base station notification that radio quality in the second cell satisfies a predetermined condition; and a step E of instructing, by the first radio base station, the second radio base station to start scheduling for the mobile station in response to the notification.

A first feature of the present invention is summarized as a radio base station including: a reception unit; and a transmission unit. Here, the transmission unit is configured to transmit a coordinated multi-point transmission-reception preparation signal to a different radio base station, the reception unit is configured, when setting information on a cell under the different radio base station is received from the different radio base station, to conduct setting of a mobile station to perform coordinated multi-point transmission-reception using the radio base station and the different radio base station, and the transmission unit is configured, when the reception unit receives notification from the mobile station, the notification indicating that radio quality in the cell under the different radio base station satisfies a predetermined condition, to instruct the different radio base station to start scheduling for the mobile station.

MODE FOR CARRYING OUT THE INVENTION (Mobile Communication System According to Embodiment of Present Invention)

A mobile communication system according to an embodiment of the present invention will be described with reference to FIG. 1 to FIG. 4.

Figure 1:
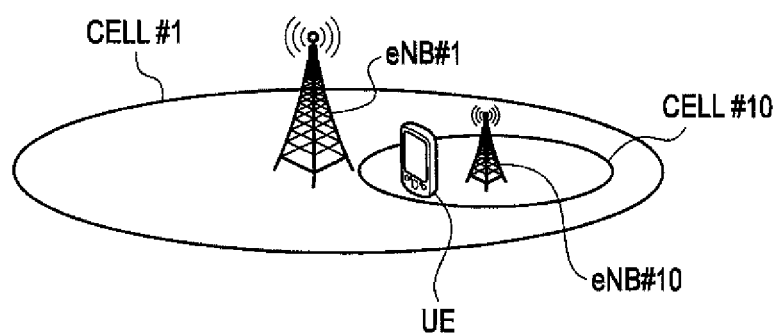
FIG. 1 is a view showing an overall configuration of a mobile communication system according to an embodiment of the present invention.

As shown in FIG. 1, a mobile communication system of this embodiment includes a radio base station eNB #1 which manages a cell #1, and a radio base station eNB #10 which manages a cell #10.

An area covered by the cell #1 and an area covered by the cell #10 are designed to at least partially overlap each other geographically. Here, the cell #1 and the cell #10 are cells using the same frequency.

For example, the cell #1 may be a macro cell while the cell #10 may be a small cell such as a phantom cell.

Meanwhile, the mobile communication system of this embodiment is configured to be capable of carrying out CoMP on a downlink between the cell #1 under the radio base station eNB #1 and the cell #10 under the radio base station eNB #10.

Figure 2:
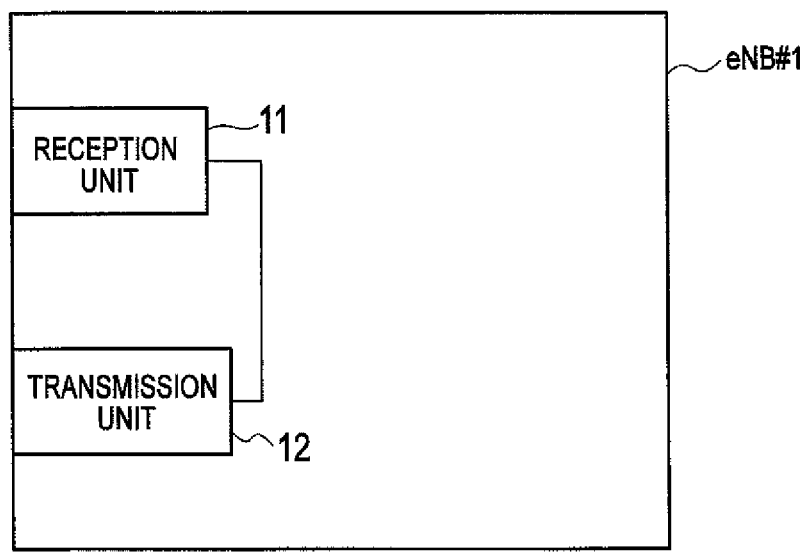
FIG. 2 is a functional block diagram of a radio base station eNB #1 according to the embodiment of the present invention.

As shown in FIG. 2, the radio base station eNB #1 of this embodiment includes a reception unit 11 and a transmission unit 12.

The reception unit 11 is configured to receive various signals from a mobile station UE and the radio base station eNB #10. The transmission unit 12 is configured to transmit various signals to the mobile station UE and the radio base station eNB #10.

For example, the transmission unit 12 is configured to transmit "CoMP preparation" to the radio base station eNB #10. Specifically, the transmission unit 12 is configured to transmit the "CoMP preparation" in a blind manner to one or more neighboring radio base stations eNB.

Moreover, the transmission unit 12 is configured, when the reception unit 11 receives setting information on the cell #10 from the radio base station eNB #10, to set the mobile station UE to perform the CoMP transmission-reception using the radio base station eNB #1 and the radio base station eNB #10.

Furthermore, the transmission unit 12 is configured, when the reception unit 11 receives notification from the mobile station UE, the notification indicating that radio quality in the cell #10 satisfies a predetermined condition, to instruct the radio base station eNB #10 to start scheduling for the mobile station UE.

An operation of the mobile communication system of this embodiment will be described below with reference to FIG. 3 and FIG. 4. Specifically, a description will be given of a procedure of a handover of the mobile station UE from the cell #1 to the cell #10 in the mobile communication system of this embodiment.

Figure 3:
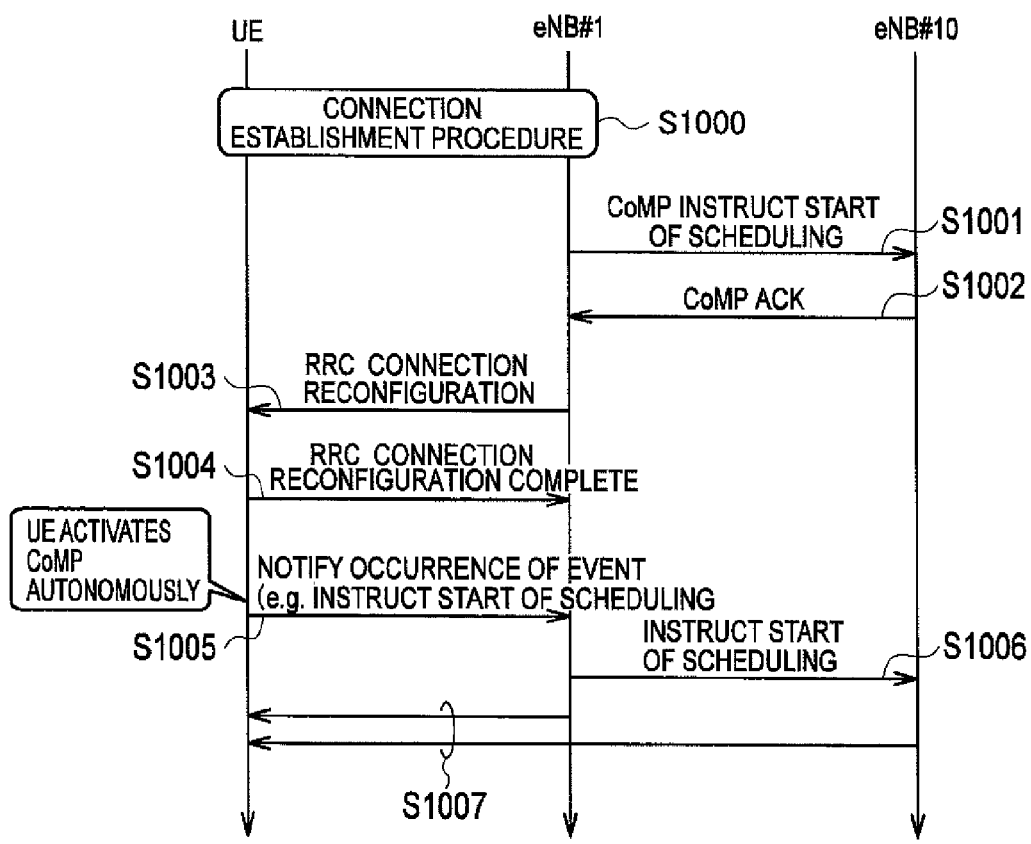
FIG. 3 is a flowchart showing an operation of the mobile communication system according to the embodiment of the present invention.
Figure 4:
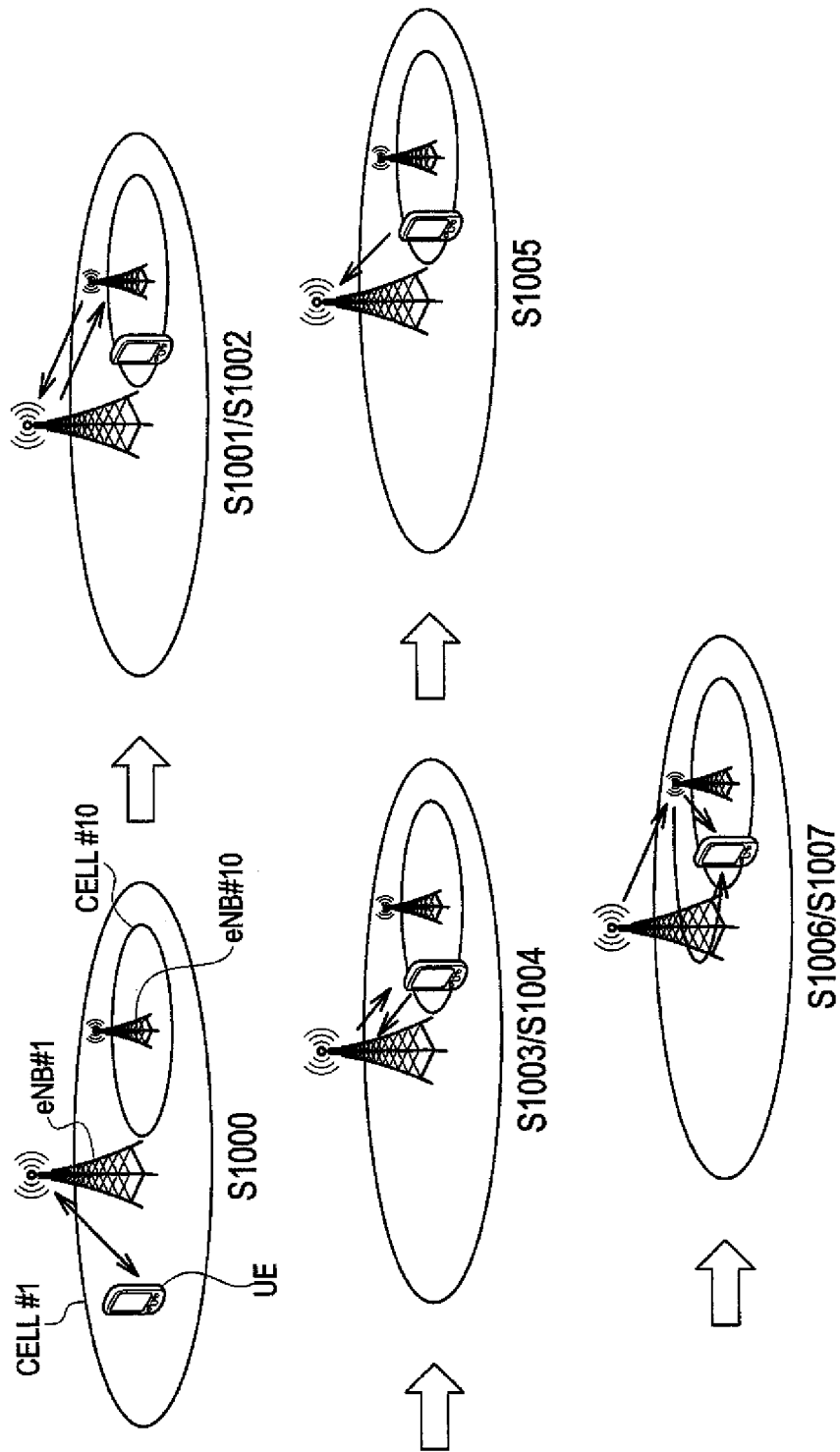
FIG. 4 is a view for explaining the operation of the mobile communication system according to the embodiment of the present invention.
Figure 5:
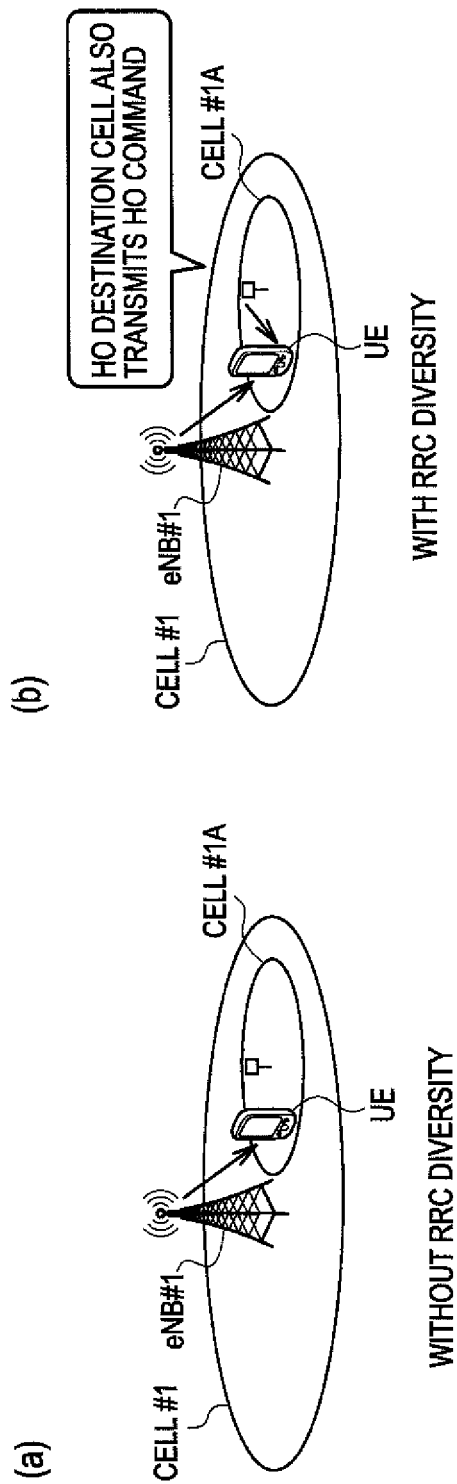
FIG. 5 is a view for explaining the related art.
Figure 6:
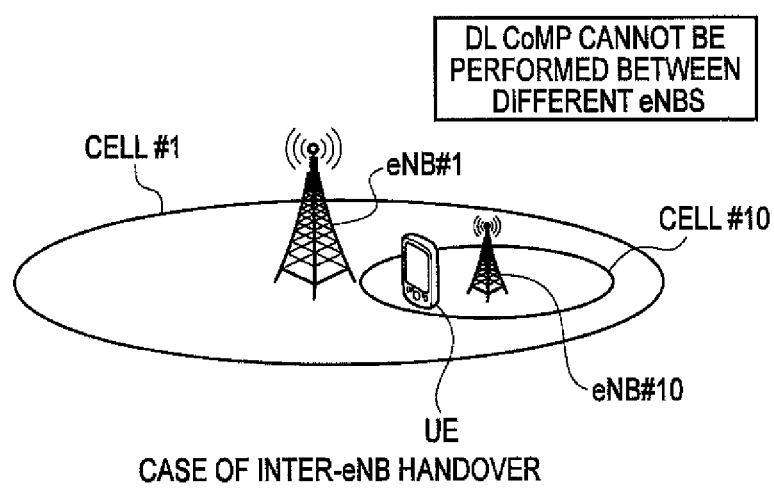
FIG. 6 is a view for explaining the related art.

As shown in FIG. 3, in step S1000, the mobile station UE connects to the cell #1 under the radio base station eNB #1.

In step S1001, the radio base station eNB #1 transmits the "CoMP preparation" in a blind manner to neighboring radio base stations eNB (inclusive of the radio base station eNB #10).

Here, the radio base station eNB #1 may transmit the "CoMP preparation" to multiple neighboring radio base stations eNB.

Alternatively, the radio base station eNB #1 may transmit the "CoMP preparation" to each of the multiple neighboring radio base stations eNB in accordance with the order of priority of the radio base stations eNB.

For instance, among the multiple neighboring radio base stations eNB, the radio base station eNB #1 may transmit the "CoMP preparation" preferentially to a radio base station eNB which is not congested very much and therefore has spare radio resources, or to a radio base station eNB which is frequently selected as a handover destination from a cell under the radio base station eNB #1.

For example, the "CoMP preparation" includes identification information on the radio base station eNB #1, identification information on the mobile station UE, a measurement result included in a "measurement report" received from the mobile station UE, and the like.

Here, the identification information on the mobile station UE may be C-RNTI (Cell-Radio Network Temporary Identity) allocated by the radio base station eNB #1, or RNTI (such as D-RNTI) especially allocated by the radio base station eNB #1 for the purpose of the "RRC diversity."

In step S1002, the radio base station eNB #10 sends the radio base station eNB #1 "CoMP ACK" which contains setting information (configuration) on the cell #10.

For example, the "CoMP ACK" includes identification information on the radio base station eNB #10, the identification information on the mobile station UE, information on resources to be allocated to the mobile station UE, and the like.

Here, the identification information on the mobile station UE may be the C-RNTI allocated by the radio base station eNB #1, or RNTI (such as D-RNTI) especially allocated by the radio base station eNB #10 for the purpose of the "RRC diversity."

Meanwhile, the information on resources to be allocated to the mobile station UE may be information on allocation of E-PDCCH for transmitting a control signal for the "RRC diversity."

Note that when the radio base station eNB #10 cannot allocate the resources for the "RRC diversity" to the mobile station UE, the radio base station eNB #10 may send the radio base station eNB #1 "CoMP NACK" instead of the "CoMP ACK."

Here, the radio base station eNB #10 may notify "cause" which shows a "resource shortage" by using the "CoMP NACK."

In step S1003, the radio base station eNB 1 sends the mobile station UE "RRC connection configuration" in order to set the CoMP transmission-reception on the downlink by using the radio base station eNB #1 and the radio base station eNB #10.

In step S1004, the mobile station UE transmits "RRC connection reconfiguration complete" to the radio base station eNB #1.

In step S1005, when the mobile station UE detects occurrence of a specific event concerning the cell #10, i.e., when the mobile station UE detects that the radio quality in the cell #10 satisfies a predetermined condition, the mobile station UE notifies the radio base station eNB #1 of the occurrence of the event. Here, the mobile station UE may make the notification by using the "measurement report" and the like.

After making the notification, the mobile station UE may autonomously activate the set CoMP transmission-reception.

For example, the mobile station UE may activate the set CoMP transmission-reception at the point when the notification is made or at the point when MAC-ACK or RLC-ACK is received in response to the notification. As a consequence, it is possible to avoid a state mismatch between the radio base station eNB #1/eNB #10 and the mobile station UE.

Here, the mobile station UE may activate the set CoMP transmission-reception only when the mobile station UP transmits a specific "measurement report," i.e., the "measurement report" for making the notification in step S1005.

Meanwhile, the mobile station UE may notify of the activation of the set CoMP transmission-reception using the "measurement report."

In this case, the radio base station eNB #1 sets "measurement object," "report config," and the like in advance concerning the "measurement report" for notifying the mobile station UE of the activation of the set CoMP transmission-reception.

For example, the mobile station UE may notify of the activation of the set CoMP transmission-reception by using a specific bit in the "measurement report."

Or, the mobile station UE may notify of the activation of the set CoMP transmission-reception by using an RRC message. The mobile station may connect the RRC message to the "measurement report."

Or, the mobile station UE may notify of the activation of the set CoMP transmission-reception by using MAC-CE (Media Access Control-Control Element).

Or, the mobile station UE may notify of the activation of the set CoMP transmission-reception through a physical channel.

Here, when the mobile station UE does not activate the set CoMP transmission-reception, the mobile station UE does not have to notify the radio base station eNB #1 of non-activation thereof, or may make the notification by using the specific bit in the "measurement report," the RRC message, the MAC-CE, the physical channel, and the like.

In step S1006, in response to the notification in step S1005, the radio base station eNB #1 instructs the radio base station eNB #10 to start scheduling for the mobile station UE (to transmit "HO command").

In step S1007, the mobile station UE attempts reception from multiple TPs (transmission points), i.e., from both the radio base station eNB #1 and the radio base station eNB #10.

Specifically, both the radio base station eNB #1 and the radio base station eNB #10 transmit the "HO command" to the mobile station UE, i.e., perform the "RRC diversity," while the mobile station UE attempts reception of the "HO command" from both the radio base station eNB #1 and the radio base station eNB #10.

Thereafter, the above-described setting of the mobile station UE to perform the CoMP transmission-reception may be cancelled at the initiative of a network.

For example, the radio base station eNB #1 may cancel the setting of the mobile station UE to perform the CoMP transmission-reception in response to the "CoMP NACK" transmitted from the radio base station eNB #10. Here, when the radio base station eNB #10 detects a resource shortage and the like, the radio base station eNB #10 may autonomously transit the "CoMP NACK" to the radio base station eNB #1.

Or, the radio base station eNB #1 may cancel the setting of the mobile station UE to perform the CoMP transmission-reception in "RRC connection release procedure" between the radio base station eNB #1 and the mobile station UE.

Or, the radio base station eNB #1 may cancel the setting of the mobile station UE to perform the CoMP transmission-reception depending on a movement state of the mobile station UE.

For example, the radio base station eNB #1 may cancel the setting of the mobile station UE to perform the CoMP transmission-reception when the radio base station eNB #1 detects a fact, on the basis of GPS information or the like on the mobile station UE, that a movement distance of the mobile station UE within a predetermined time period is smaller than a predetermined threshold or when the handover procedure does not take place after a lapse of a predetermined period after the setting of the CoMP transmission-reception is performed, for example.

Meanwhile, the above-described setting of the mobile station UE to perform the CoMP transmission-reception may be cancelled at the initiative of the mobile station UE.

For example, the mobile station UE may cancel the setting of the CoMP transmission-reception when the mobile station UE detects an RLF (Radio Link Failure) between the mobile station UE and the radio base station eNB #1 or the radio base station eNB #10.

Or, the mobile station UE may cancel the setting of the CoMP transmission-reception in the case of transition from "RRC_Connected state" to "RRC_IDLE state."

Or, the radio base station eNB #1 may cancel the setting of the mobile station UE to perform the CoMP transmission-reception in response to a cancellation request received from the mobile station UE.

Here, when the mobile station UE desires to cancel the setting of the CoMP transmission-reception, the mobile station UE can autonomously transmit a cancellation request to the radio base station eNB #1.

For example, the mobile station UE may perform the above-mentioned cancellation request by notifying of "a desire to perform power saving" by use of "PPI (Power Preference Indicator)" defined in LTE Release-11.

The features of the present embodiment may also be expressed as follows.

A first feature of the present embodiment is summarized as a mobile communication method including: a step A of transmitting, by a radio base station eNB#1 (first radio base station) managing a cell #1 (first cell), a "CoMP preparation (coordinated multi-point transmission-reception preparation signal)" to a radio base station eNB#10 (second radio base station) managing a cell #10 (second cell); a step B of transmitting, by the radio base station eNB#10, setting information (configuration) on the cell #10 to the radio base station eNB#1; a step C of conducting, by the radio base station eNB#1, setting of a mobile station UE to perform CoMP transmission-reception (coordinated multi-point transmission-reception) using the radio base station eNB#1 and the radio base station eNB#10; a step D of giving, by the mobile station UE, the radio base station eNB#1 notification that radio quality in the cell #10 satisfies a predetermined condition; and a step E of instructing, by the radio base station eNB#1, the radio base station eNB#10 to start scheduling for the mobile station UE in response to the notification.

According to the above-described aspect, the CoMP on the downlink can be carried out between the cell #1 under the radio base station eNB #1 and the cell #10 under the radio base station eNB #10. As a result, in the handover procedure between the cell #1 under the radio base station eNB #1 and the cell #10 under the radio base station eNB #10, it is possible to implement the "RRC diversity" at the initiative of the mobile station UE.

In the first feature of the present embodiment, the "CoMP preparation" may include: identification information on the radio base station eNB#1; identification information on the mobile station UE; and a measurement result included in a "measurement report" received from the mobile station UE.

According to the above-described feature, the radio base station eNB #10 can acquire the information necessary for carrying out the CoMP on the downlink, i.e., for implementing the "RRC diversity."

In the first feature of the present embodiment, the radio base station eNB#10 may transmit the setting information on the cell #10 by using "CoMP ACK (coordinated multi-point transmission-reception acknowledgment signal)" in the step B, and the "CoMP ACK" may include: identification information on the radio base station eNB#10; identification information on the mobile station UE; and information on a resource to be allocated to the mobile station UE.

According to the above-described feature, the radio base station eNB #1 can acquire the information necessary for carrying out the CoMP on the downlink, i.e., for implementing the "RRC diversity."

In the first feature of the present embodiment, the mobile communication method further may include the step of: canceling, by the radio base station eNB#1, the setting of the mobile station UE to perform the CoMP transmission-reception in response to "CoMP NACK (coordinated multi-point transmission-reception non-acknowledgment signal)" transmitted from the radio base station eNB#10.

According to the above-described feature, the radio base station eNB #1 can appropriately cancel the setting of the mobile station UE to perform the CoMP transmission-reception when a resource shortage or the like occurs in the radio base station eNB #10.

In the first feature of the present embodiment, the mobile communication method further may include the step of: canceling, by the radio base station eNB#1, the setting of the mobile station UE to perform the CoMP transmission-reception in an RRC connection release procedure between the radio base station eNB#1 and the mobile station UE.

According to the above-described feature, it is possible to cancel the setting of the mobile station UE to perform the CoMP transmission-reception, which becomes unnecessary, at the timing to release the RRC connection between the radio base station eNB #1 and the mobile station UE.

In the first feature of the present embodiment, the mobile communication method further may include the step of: canceling, by the radio base station eNB#1, the setting of the mobile station UE to perform the "COMP transmission-reception depending on a movement state of the mobile station UE.

According to the above-described feature, the radio base station eNB #1 can cancel the setting of the mobile station CE to perform the CoMP transmission-reception in a situation where the mobile station UP hardly moves and it is unlikely that the handover procedure takes place.

In the first feature of the present embodiment, the mobile communication method further may include the step of: canceling, by the mobile station UE, the setting of the COMP transmission-reception when the mobile station UE detects an RLF (Radio Link Failure) between the mobile station UE and the radio base station eNB#1 or the radio base station eNB#10.

According to the above-described feature, the mobile station UE detects the RLF between the mobile station UE and the radio base station eNB #1 or the radio base station eNB #10, and can cancel the setting of the mobile station UE to perform the CoMP transmission-reception, which becomes unnecessary at the timing to perform a reestablishment procedure.

The first aspect of this embodiment may further include a step of canceling, by the mobile station UE, the setting of the coordinated multi-point transmission-reception in the case of transition to "RRC_IDLE state."

According to the above-described feature, the mobile station UE can cancel the setting of the CoMP transmission-reception, which becomes unnecessary, at the timing of the transition to the "RRC_IDLE state."

In the first feature of the present embodiment, the mobile communication method further may include the step of: canceling, by the radio base station eNB#1, the setting of the mobile station UE to perform the COMP transmission-reception in response to a cancellation request received from the mobile station UE.

According to the above-described feature, the mobile station UE can autonomously avoid battery consumption attributed to carrying out the CoMP transmission-reception on the downlink.

In the first feature of the present embodiment, the mobile station UE autonomously may activate the COMP transmission-reception after the notification is given in the step D.

According to the above-described feature, the mobile station UE can activate the CoMP transmission-reception before "HO command" is transmitted from the radio base station eNB #10.

In the first aspect of this embodiment, the mobile station UE may make the above-described notification by using a "measurement report" in the step D According to the above-described feature, the radio base station eNB #1 can recognize the activation of the CoMP transmission-communication by the mobile station UE. Thus, it is possible to adjust the timing to start transmission of the "HO command" from the radio base station eNB #10.

A second feature of the present embodiment is summarized as a radio base station eNB#1 including: a reception unit 11 and a transmission unit 12. Here, the transmission unit 12 is configured to transmit "CoMP preparation" to a radio base station eNB#10 (different radio base station), the reception unit 11 is configured, when setting information on a cell under the radio base station eNB#10 is received from the radio base station eNB#10, to conduct setting of a mobile station UE to perform COMP transmission-reception using the radio base station eNB#1 and the radio base station eNB#10, and the transmission unit 12 is configured, when the reception unit 11 receives notification from the mobile station UE, the notification indicating that radio quality in the cell #10 under the radio base station eNB#10 satisfies a predetermined condition, to instruct the radio base station eNB#10 to start scheduling for the mobile station UE.

According to the above-described aspect, the CoMP on the downlink can be carried out between the cell #1 under the radio base station eNB #1 and the cell #10 under the radio base station eNB #10. As a result, in the handover procedure between the cell #1 under the radio base station eNB #1 and the cell #10 under the radio base station eNB #10, it is possible to implement the "RRC diversity" at the initiative of the mobile station UE.

It should be noted that the foregoing operations of the mobile station UE and radio base stations eNB#1/eNB#10 may be implemented by hardware, may be implemented by a software module executed by a processor, or may be implemented in combination of the two.

The software module may be provided in a storage medium in any format, such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to a processor so that the processor can read and write information from and to the storage medium. Instead, the storage medium may be integrated in a processor. The storage medium and the processor may be provided inside an ASIC. Such an ASIC may be provided in the mobile station UE and radio base stations eNB#1/eNB#10. Otherwise, the storage medium and the processor may be provided as discrete components inside the mobile station UE and radio base stations eNB#1/eNB#10.

Hereinabove, the present invention has been described in detail by use of the foregoing embodiments. However, it is apparent to those skilled in the art that the present invention should not be limited to the embodiments described in the specification. The present invention can be implemented as an altered or modified embodiment without departing from the spirit and scope of the present invention, which are determined by the description of the scope of claims. Therefore, the description of the specification is intended for illustrative explanation only and does not impose any limited interpretation on the present invention.

Note that the entire content of Japanese Patent Application No. 2013-099356 (filed on May 9, 2013) is incorporated by reference in the present specification.

INDUSTRIAL APPLICABILITY

As described above, according to the present invention, it is possible to provide a mobile communication method and a radio base station, which are capable of implementing "RRC diversity" at the initiative of a radio base station UE in a handover procedure between cells under different radio base stations eNB.

EXPLANATION OF THE REFERENCE NUMERALS eNB #1, eNB #10 radio base station
UE mobile station
11 reception unit
12 transmission unit

The invention claimed is:

1. A mobile communication method comprising:
  a step A of transmitting, by a first radio base station managing a first cell, a coordinated multi-point transmission-reception preparation signal to a second radio base station managing a second cell;
  a step B of transmitting, by the second radio base station, setting information on the second cell to the first radio base station;
  a step C of conducting, by the first radio base station, setting of a mobile station to perform coordinated multi-point transmission-reception using the first radio base station and the second radio base station;
  a step D of giving, by the mobile station, the first radio base station notification that radio quality in the second cell satisfies a predetermined condition; and
  a step E of instructing, by the first radio base station, the second radio base station to start scheduling for the mobile station in response to the notification, wherein
  the second radio base station transmits the setting information on the second cell by using a coordinated multi-point transmission-reception acknowledgment signal in the step B,
  wherein the coordinated multi-point transmission-reception acknowledgment signal includes:
    identification information on the second radio base station;
    identification information on the mobile station; and
    information on a resource to be allocated to the mobile station.

2. The mobile communication method according to claim 1, wherein the coordinated multi-point transmission-reception preparation signal comprises:
  identification information on the first radio base station;
  identification information on the mobile station; and
  a measurement result included in a measurement report received from the mobile station.

3. The mobile communication method according to claim 1, further comprising the step of:
  canceling, by the first radio base station, the setting of the mobile station to perform the coordinated multi-point transmission-reception in response to a coordinated multi-point transmission-reception non-acknowledgment signal transmitted from the second radio base station.

4. The mobile communication method according to claim 1, further comprising the step of:
  canceling, by the first radio base station, the setting of the mobile station to perform the coordinated multi-point transmission-reception in a Radio Resource Control (RRC) connection release procedure between the first radio base station and the mobile station.

5. The mobile communication method according to claim 1, further comprising the step of:
  canceling, by the first radio base station, the setting of the mobile station to perform the coordinated multi-point transmission-reception depending on a movement state of the mobile station.

6. The mobile communication method according to claim 1, further comprising the step of:
  canceling, by the mobile station, the setting of the coordinated multi-point transmission-reception when the mobile station detects a radio link failure between the mobile station and the first radio base station or the second radio base station.

7. The mobile communication method according to claim 1, further comprising the step of:
  canceling, by the first radio base station, the setting of the mobile station to perform the coordinated multi-point transmission-reception in response to a cancellation request received from the mobile station.

8. The mobile communication method according to claim 1, wherein the mobile station autonomously activates the coordinated multi-point transmission-reception after the notification is given in the step D.

9. A radio base station comprising:
  a receiver; and
  a transmitter, wherein
  the transmitter is configured to transmit a coordinated multi-point transmission-reception preparation signal to a different radio base station,
  the receiver is configured, when setting information on a cell under the different radio base station is received from the different radio base station, to conduct setting of a mobile station to perform coordinated multi-point transmission-reception using the radio base station and the different radio base station, and
  the transmitter is configured, when the receiver receives notification from the mobile station, the notification indicating that radio quality in the cell under the different radio base station satisfies a predetermined condition, to instruct the different radio base station to start scheduling for the mobile station, wherein
  the different radio base station transmits the setting information on the cell under the different radio base station by using a coordinated multi-point transmission-reception acknowledgment signal,
  wherein the coordinated multi-point transmission-reception acknowledgment signal includes:
    identification information on the second radio base station;
    identification information on the mobile station; and
    information on a resource to be allocated to the mobile station.

* * * * *